(12) United States Patent
Tabushi

(10) Patent No.: US 12,197,795 B2
(45) Date of Patent: Jan. 14, 2025

(54) PRINTING DEVICE PERFORMING RESOURCE MONITORING PROCESS TO INCREASE AMOUNT OF AVAILABLE SPACE OF MEMORY

(71) Applicant: Brother Kogyo Kabushiki Kaisha, Nagoya (JP)

(72) Inventor: Chika Tabushi, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/050,558

(22) Filed: Oct. 28, 2022

(65) Prior Publication Data

US 2023/0185495 A1 Jun. 15, 2023

(30) Foreign Application Priority Data

Dec. 9, 2021 (JP) .................................. 2021-199919

(51) Int. Cl.
*G06F 3/12* (2006.01)
*G06K 15/02* (2006.01)

(52) U.S. Cl.
CPC ............ *G06F 3/122* (2013.01); *G06F 3/1229* (2013.01); *G06K 15/1822* (2013.01); *G06K 15/1849* (2013.01); *G06K 15/1886* (2013.01)

(58) Field of Classification Search
CPC ... G06F 3/122; G06F 3/1229; G06K 15/1822; G06K 15/1849; G06K 15/1809; G06K 15/181; G06K 15/1813; G06K 15/1815; G06K 15/1817; G06K 15/1823; G06K 15/1825; G06K 15/1836; G06K 15/1851; G06K 15/1853; G06K 15/1861; G06K 15/1865; G06K 15/1886; G06K 15/1855; G06K 15/1856

See application file for complete search history.

(56) References Cited

U.S. PATENT DOCUMENTS

2004/0100656 A1\* 5/2004 Kuroki .................... G06F 3/122
358/404
2007/0223025 A1\* 9/2007 Hashizume ........ G06K 15/1815
358/1.13

(Continued)

FOREIGN PATENT DOCUMENTS

JP 2019-159618 A 9/2019

*Primary Examiner* — Juan M Guillermety
(74) *Attorney, Agent, or Firm* — Scully, Scott, Murphy & Presser, P.C.

(57) ABSTRACT

In a printing device a computer creates raster data based on an image file. When creating the raster data, the computer selects a target object in the image file and performs selected one of first, second, and third processes. The first process is to store a set of extraction data. The second process is performed when the target object includes content data. The second process is to create a set of intermediate data based on the target object. The third process is performed when the target object includes data on a reference to another object. The third process is to store a set of extraction data from the another object. The raster data is created by performing a drawing process on one or more sets of created intermediate data. The computer increases an amount of available space of the memory by deleting one or more sets of extraction data.

15 Claims, 9 Drawing Sheets

(56) References Cited

U.S. PATENT DOCUMENTS

| | | | |
|---|---|---|---|
| 2008/0137135 A1* | 6/2008 | Takeishi | G06K 15/1857 358/1.15 |
| 2011/0157635 A1* | 6/2011 | Takizawa | H04N 1/00347 358/1.15 |
| 2012/0212782 A1* | 8/2012 | Matsuda | G06K 15/1857 358/1.15 |
| 2012/0262760 A1* | 10/2012 | Kanai | G06K 15/1822 358/3.06 |
| 2014/0104645 A1* | 4/2014 | Hayakawa | G06K 15/1827 358/1.15 |
| 2015/0268907 A1* | 9/2015 | Ishijima | G06K 15/1823 358/1.15 |
| 2015/0371126 A1* | 12/2015 | Ota | G06K 15/1823 358/1.14 |
| 2018/0101754 A1* | 4/2018 | Achiwa | G06K 15/1857 |
| 2018/0181846 A1* | 6/2018 | Koziarz | G06K 15/1817 |
| 2019/0278542 A1 | 9/2019 | Iida | |
| 2021/0303945 A1* | 9/2021 | Tabushi | G06K 15/1822 |

\* cited by examiner

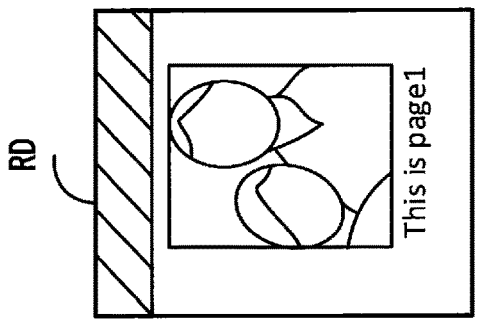
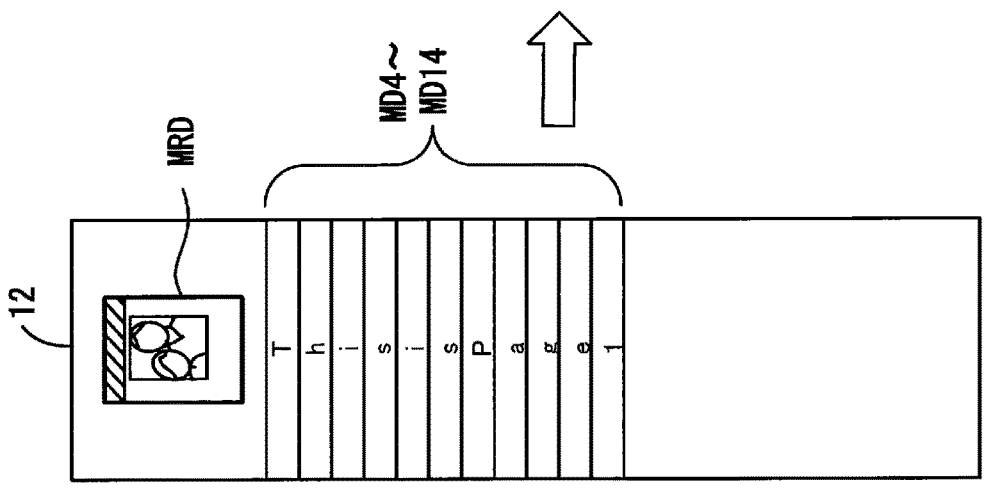
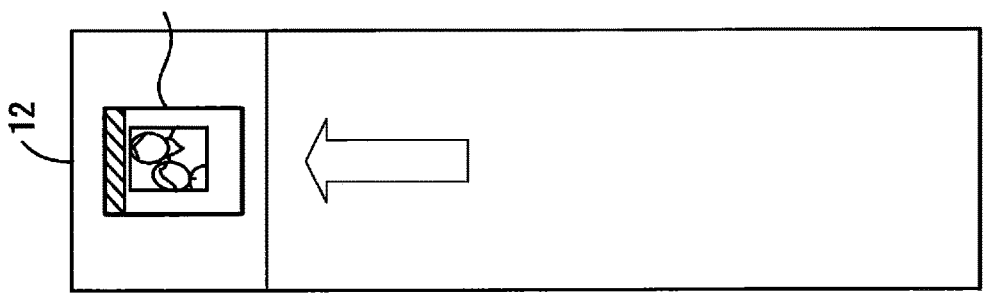
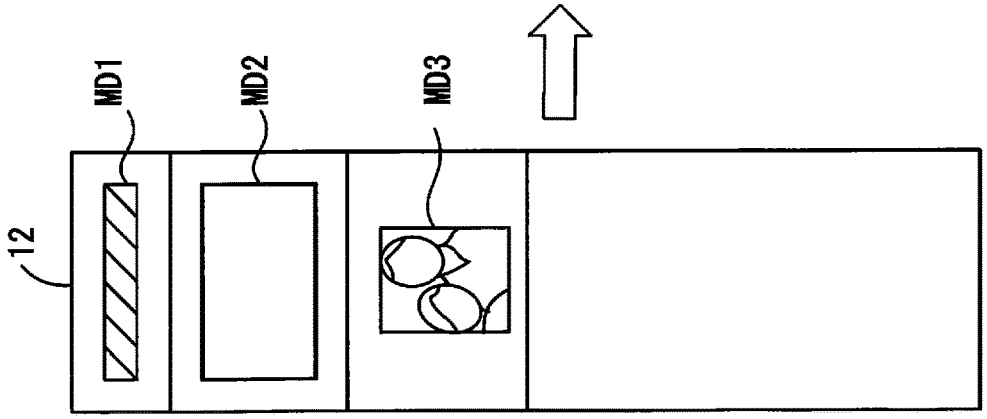

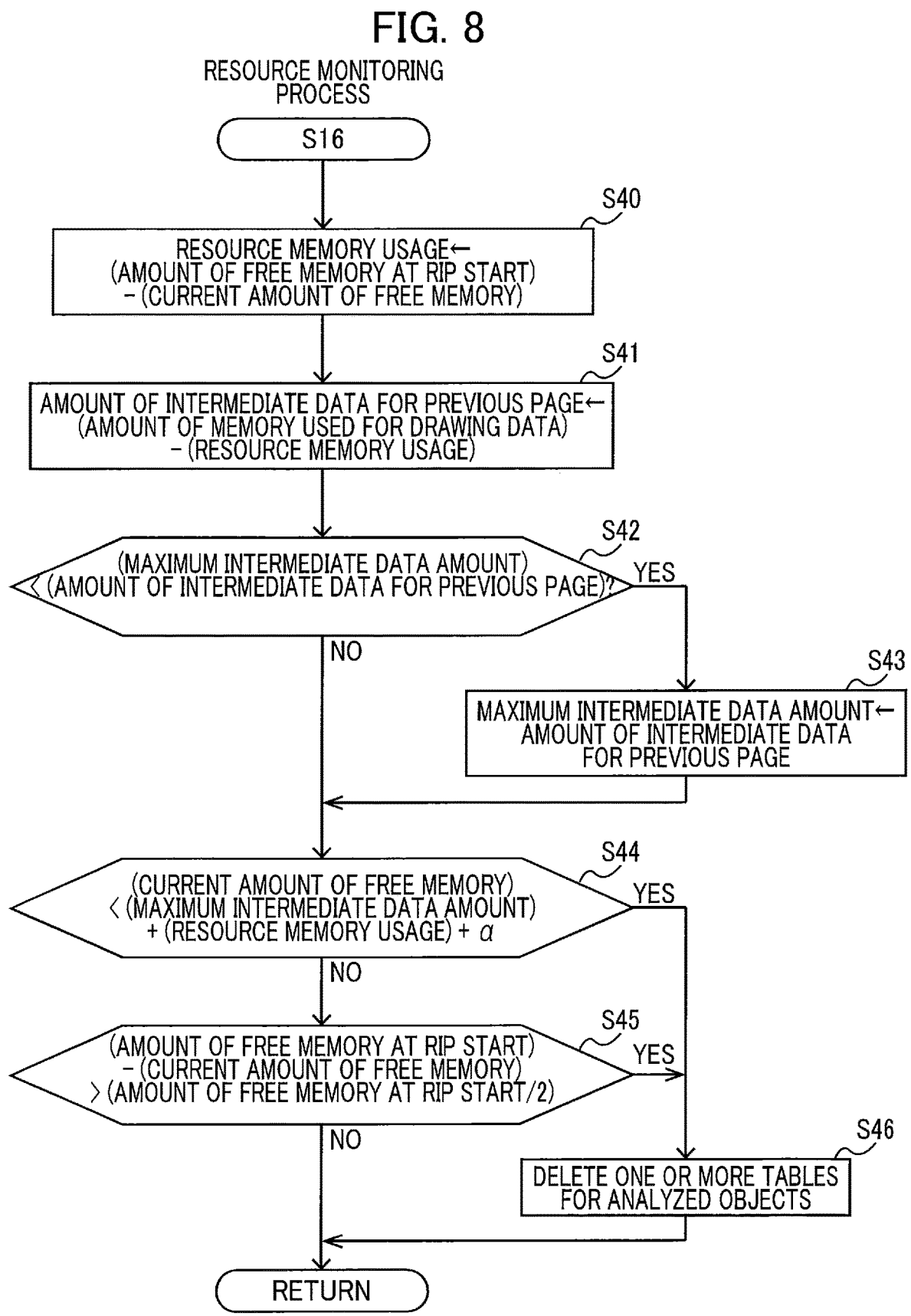

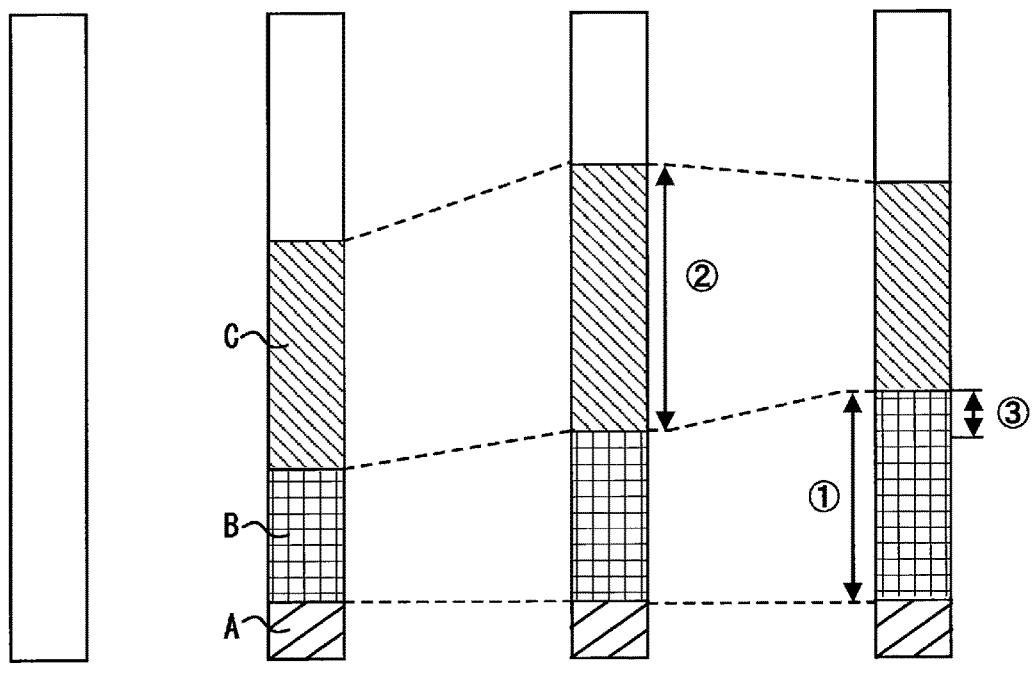

PRINTING DEVICE PERFORMING RESOURCE MONITORING PROCESS TO INCREASE AMOUNT OF AVAILABLE SPACE OF MEMORY

REFERENCE TO RELATED APPLICATIONS

This application claims priority from Japanese Patent Application No. 2021-199919 filed on Dec. 9, 2021. The entire content of the priority application is incorporated herein by reference.

BACKGROUND ART

A conventional printing device creates raster data from an image file and performs a print based on this raster data. Specifically, the printing device analyzes objects in the image file and creates intermediate data according to the results of the analysis. After creating one page worth of intermediate data, for example, the printing device creates one page worth of raster data based on this intermediate data.

DESCRIPTION

Each time raster data is created, the data extracted from objects for creating the raster data is stored in memory. When the amount of data extracted from the objects is large, the conventional printing device may run out of available space in memory to store this data, potentially impeding the printing process.

In view of the foregoing, it is an object of the present disclosure to provide a technology for avoiding impediments to a printing process caused by insufficient available memory when analyzing objects in an image file to create raster data.

In order to attain the above and other object, according to one aspect, the present disclosure provides a printing device. The printing device includes a memory, a printing mechanism, and a computer. The computer is configured to perform: an acquiring process to acquire an image file having a plurality of objects; a raster data creating process to analyze the acquired image file and create raster data based on the image file by using a result of analyzing; and a printing process to print an image based on the created raster data. In the raster data creating process, the computer is configured to perform: selecting a target object from the plurality of objects in the image file; and an object process based on the selected target object in which selected one of a first process, a second process, and a third process is performed. The first process is to store in the memory data as a set of extraction data to be used to create the raster data by analyzing and at least partially extracting data from the target object. The second process is performed when the target object includes content data, the second process being to create a set of intermediate data based on the target object, and to store the created set of intermediate data in the memory. The third process is performed when the target object includes data on a reference to another object, the third process being to store in the memory, data as a set of extraction data to be used to create the raster data by analyzing and at least partially extracting data from the another object. Each time a new target object is selected, the object process is performed on the new target object and corresponding one of a set of extraction data and a set of intermediate data is stored in the memory. The raster data is created by performing a drawing process on one or more sets of created intermediate data. The computer is configured to further perform: a resource monitoring process, when the memory is in a prescribed state during the raster data creating process, the resource monitoring process being to increase an amount of available space of the memory by deleting one or more sets of extraction data from the memory, the prescribed state being a state satisfying that the amount of available space of the memory is smaller than the amount of available space of the memory before the raster data creating process is performed and satisfying a prescribed condition.

With the configuration, when the printing device creates the raster data, the printing device can increase the amount of available space in the memory prior to hindrance of printing operation due to a lack of an available space in the memory.

FIGS. 7A-7D are explanatory diagrams illustrating an intermediate flush.

FIG. 8 is a flowchart illustrating a resource monitoring process of S16 shown in FIG. 2.

FIGS. 9A-9D are explanatory diagrams illustrating change of an amount of available space of a memory.

EMBODIMENT

Figure 1:
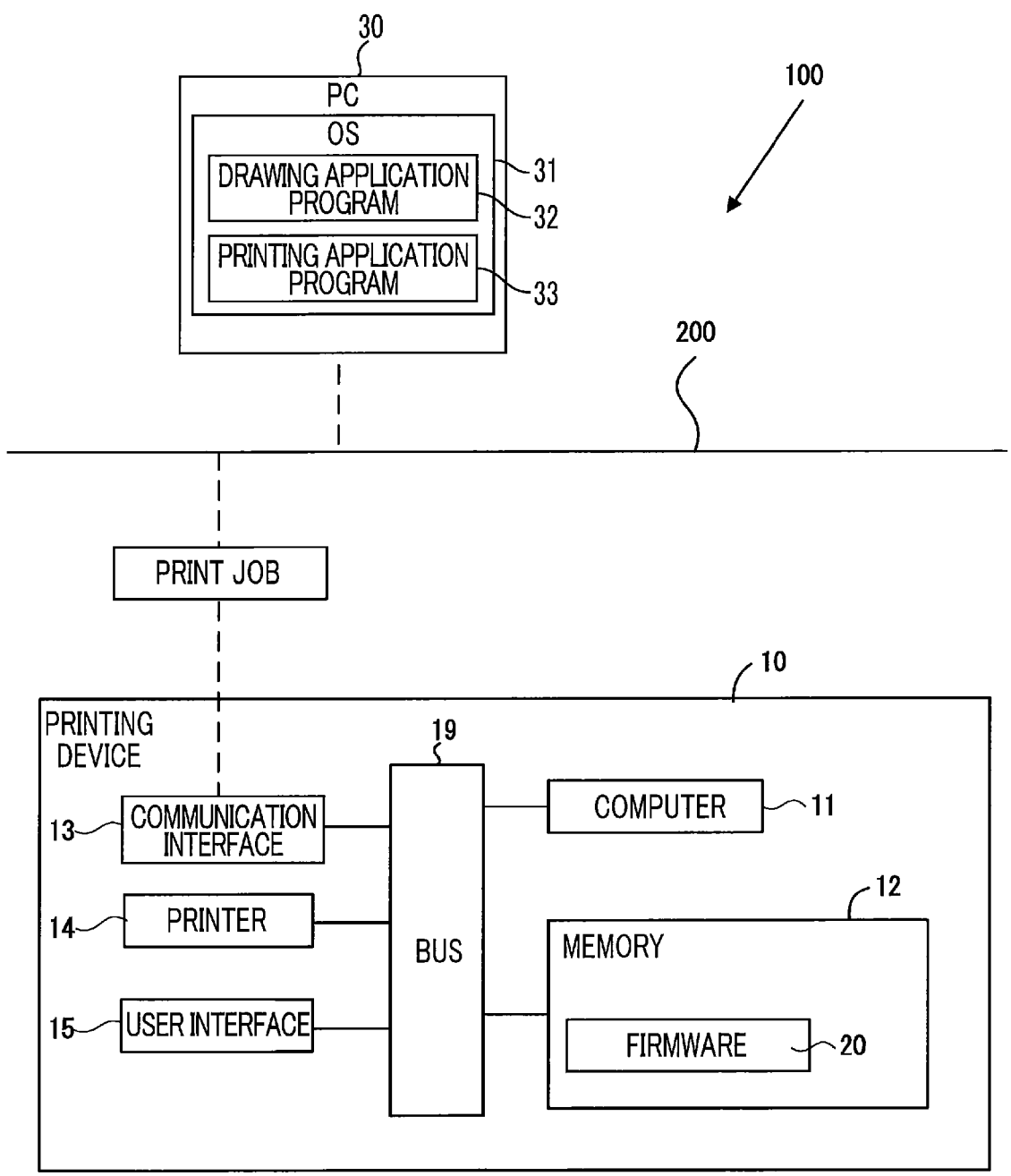
FIG. 1 is an explanatory diagram illustrating configurations of an image formation system.

An image formation system 100 according to an embodiment will be described while referring to the accompanying drawings. As shown in FIG. 1, the image formation system 100 is provided with a printing device 10, and a personal computer (PC) 30. The printing device 10 and the PC 30 are connected to a network 200 and can communicate with each other via the network 200. The network 200 is a LAN or internet, for example.

Here, the configuration of the printing device 10 will be described. The printing device 10 is provided with a computer 11, a memory 12, a communication interface 13, a printer (print engine) 14, a user interface 15, and a bus 19. The printer 14 is an example of the printing mechanism.

The communication interface 13 connects the printing device 10 to the network 200 in accordance with a prescribed communication protocol. The user interface 15 provides an interface between the user, who directly operates the printing device 10, and the computer 11. The user interface 15 has a touchscreen, and physical operation keys. The printer 14 executes printing operations for printing images on recording media, such as sheets and discs. The recording method employed by the printer 14 may be the inkjet method or electrophotographic method, for example.

The computer 11 is configured of a central processing unit (CPU), an application-specific integrated circuit (ASIC), and the like. The computer 11 controls operations of the printer 14, the communication interface 13, and the user interface 15. The memory 12 is provided with a data storage area. The data storage area stores data required for executing programs and the like. The memory 12 is configured as a combination of RAM (random access memory), ROM (read only memory), SSD (solid state drive), HDD (hard disk drive), and etc. A buffer provided in the computer 11 may be a part of the memory 12. The memory 12 may be any storage medium that can be read by the computer 11. A computer-readable storage medium is a non-transitory medium. In addition to the above examples, non-transitory media include CD-ROM and DVD-ROM. A non-transitory medium is also a tangible medium. On the other hand, electric signals that convey programs downloaded from a server or the like on the Internet are a computer-readable signal medium, which is one type of computer-readable medium but is not considered a non-transitory computer-readable storage medium.

The memory 12 stores firmware 20 as a program that can be executed by the computer 11. In the following description, the phrase "the firmware 20" may signify "the computer 11 executing the firmware 20." In general, the computer 11 performs according to instructions described in programs such as a program described in the firmware 20. In other words, actions such as "determine," "extract," "select," "calculate," "set," "identify, and the like in the following description represent steps performed by the computer 11. Note that the term "acquire" in this specification is used as a concept that does not necessarily require a request. In other words, a process by which the computer 11 receives data without requesting that data is included in the concept of "the computer 11 acquires data." The term "data" described herein is expressed as bit strings that can be read by a computer. Data of different formats are treated as the same data when the content of the data is essentially the same. The same holds true for "information" in this specification.

Next, the configuration of the PC 30 will be described. Although not shown in the drawing, the PC 30 is provided with a communication interface, a memory, a controller (computer), a display, and a user interface, similar to the printing device 10.

The memory stores an operating system (OS) 31, a drawing application program 32, and a printing application program 33. The drawing application program 32 generates image files under management of the OS 31. An image file is data representing a target image according to instructions in a prescribed page description language, for example. In the present embodiment, the image file is a PDF file using a file format known as the Portable Document Format (PDF). Images in PDF files are described according to instructions in a description language based on PostScript (U.S. trademark of Adobe inc.). The printing application program 33 creates print jobs that include image files and transmits the print jobs to the printing device 10.

The firmware 20 implements an acquisition process to acquire a print job. The computer 11 executing the firmware 20 analyzes an image file included in an acquired print job and executes a raster data creation process to create raster data based on the image file according to the results of this analysis. The firmware 20 also executes a printing process for controlling the printer 14 to perform a print based on the raster data created in the raster data creation process.

Figure 2:
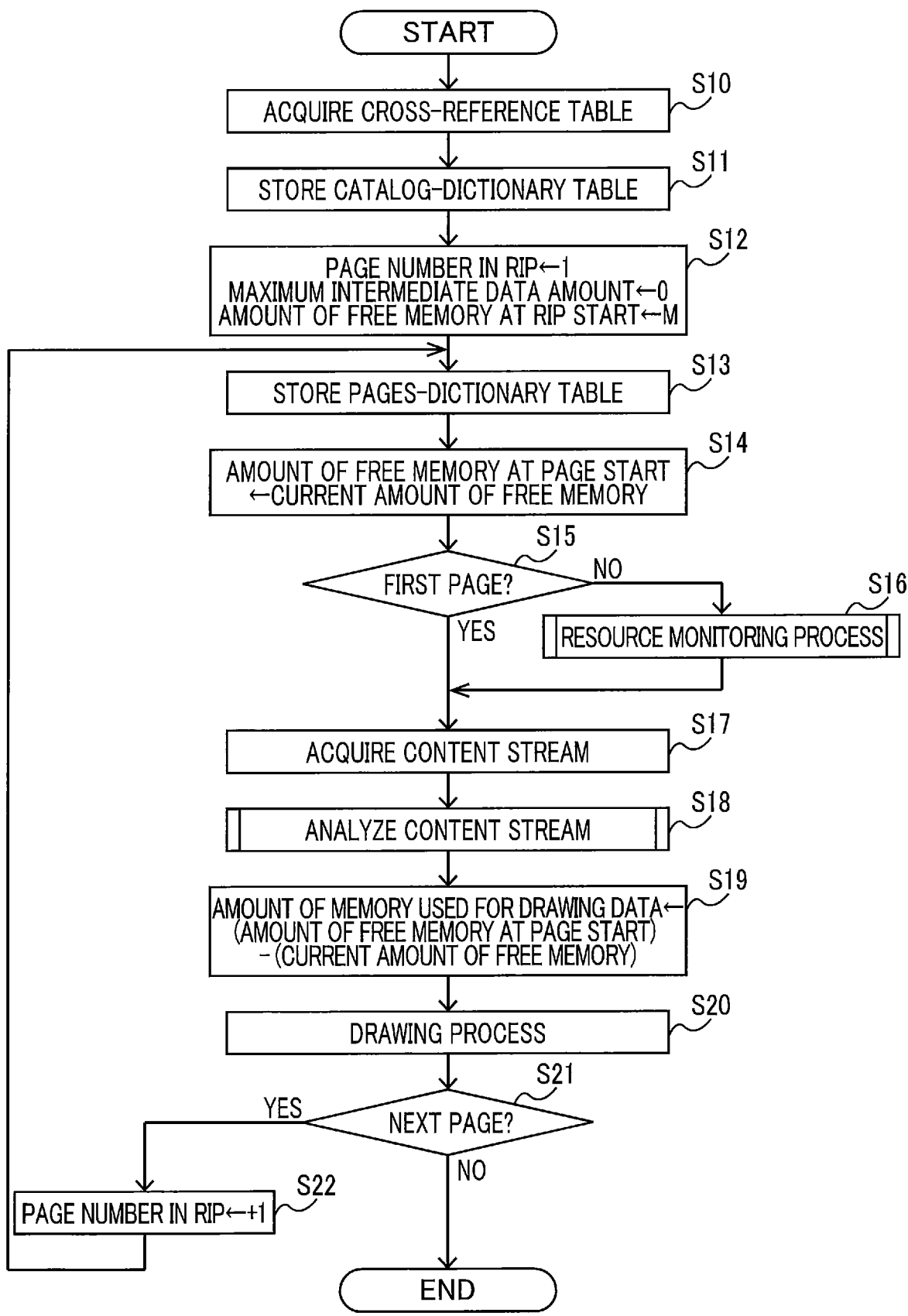
FIG. 2 is a flowchart illustrating a raster data creation process.

Next, the raster data creation process executed according to the firmware 20 will be described with reference to FIG. 2. The process shown in FIG. 2 is executed by the computer 11 executing the firmware 20 when the printing device 10 receives a print job from the PC 30 via the network 200.

Figure 3:
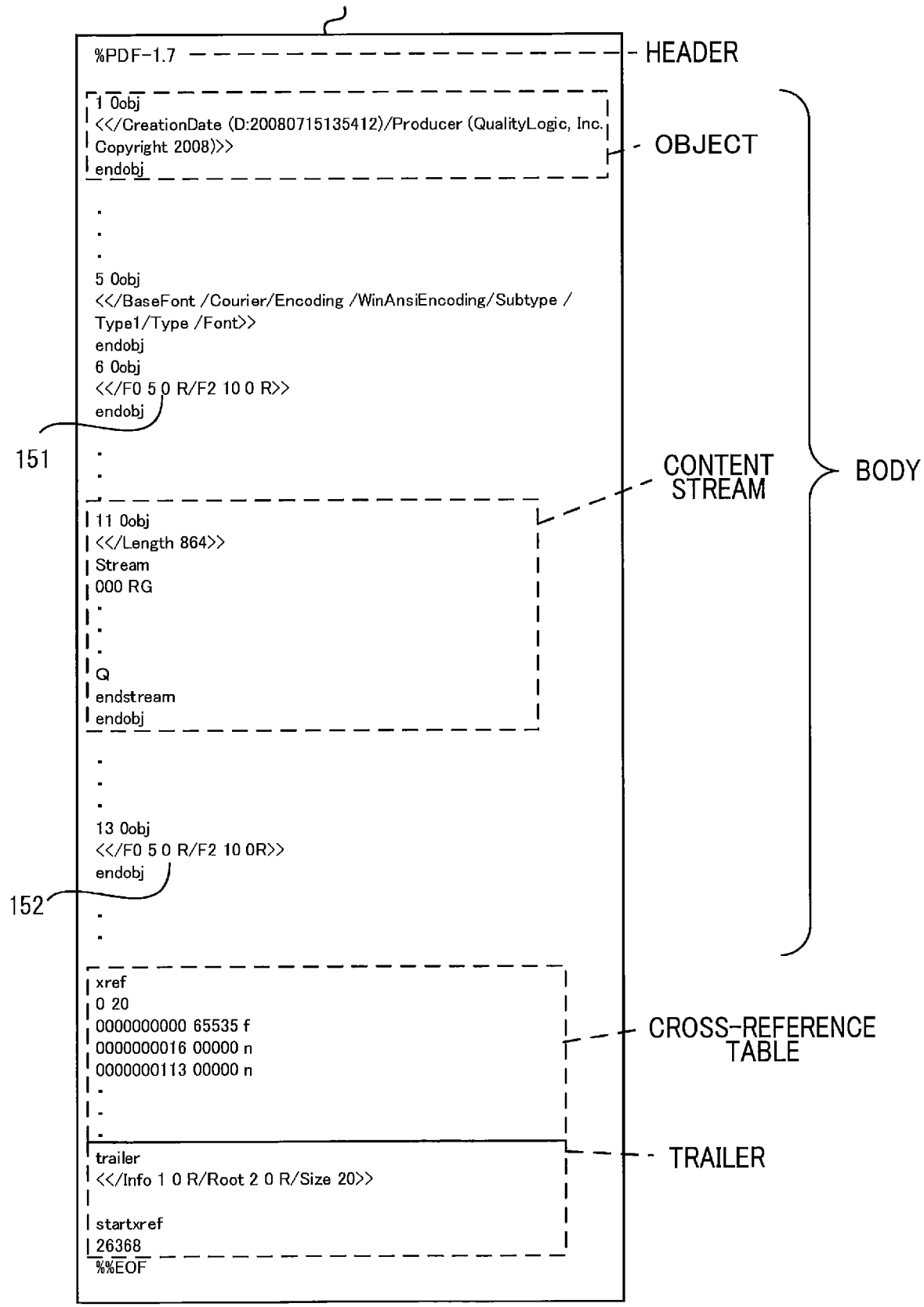
FIG. 3 is an explanatory diagram illustrating configuration of an image file.

In Step 10 of FIG. 2 (hereinafter the abbreviation "S" will be used in place of "Step"), the computer 11 acquires a cross-reference table from an image file 150 included in the print job. Before describing the details of S10, the structure of the image file 150 will be described with reference to FIG. 3. As shown in FIG. 3 the image file 150 includes a header, a body, the cross-reference table, and a trailer.

Figure 4:
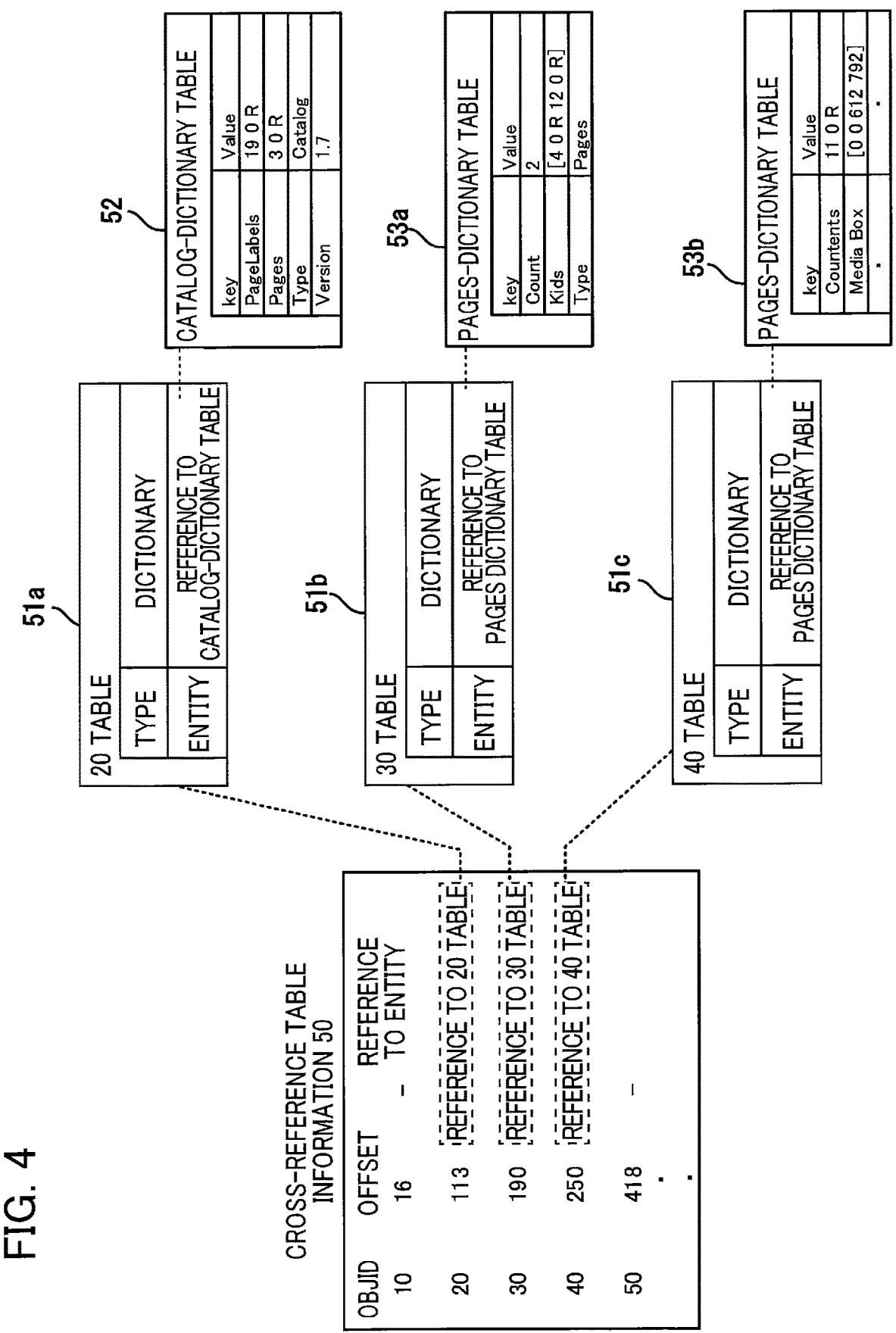
FIG. 4 is an explanatory diagram illustrating configurations of tables created from the image file.

The cross-reference table is located after the body of the image file 150, and specifically is information beginning with the description "xref". A cross-reference table information 50 shown in FIG. 4 (described later) is a table which is extracted from the cross-reference table in the image file 150 and stored in the memory 12, and thus the cross-reference table information 50 includes all or part of information included in the cross-reference table of the image file 150. The cross-reference table in the image file 150 is a table that associates labels (ObjID) identifying objects in the body with their offset positions. An "offset position" is information specifying where in the image file 150 the object indicated by the label is located, and specifically specifies the number of bytes from the beginning of the image file 150. In S10 the computer 11 analyzes a trailer dictionary included in the trailer to identify the location of the cross-reference table. In the example of FIG. 3, the number following the keyword "startxref" in the trailer dictionary is "26368", indicating that the cross-reference table is located 26,368 bytes from the start of the image file 150. Since the cross-reference table information 50 is created by extracting data from the cross-reference table of the image file 150, as shown in FIG. 4 the cross-reference table information 50 also has the same association (correlation) between the labels (ObjID) and their offset positions.

In S11 the computer 11 analyzes objects included in the image file 150 and acquires a catalog dictionary (document catalog), and stores all or part of information of the acquired catalog dictionary as a catalog dictionary table 52 in the memory 12. The catalog dictionary is a dictionary provided in the root object of the body. The body is configured of a plurality of objects composing a tree structure originated from a root object. Each single object is configured of a description beginning from information including an object number and the text "obj" (e.g., "N0obj") and ending with the text "endobj". Here, "N0" is a label for identifying the object and is configured of the object number at the start (N) followed by the generation number (0). The object number is an integer of 1 or greater. All objects in the body are linked together through a tree structure whose root is the root object. Hereinafter, an object assigned the label "N 0" will be referred to as "object N0".

In this example, the computer 11 acquires all or part of information of the catalog dictionary and stores all or part of information of the acquired catalog dictionary as the catalog-dictionary table 52 in the memory 12. To acquire and store the catalog-dictionary table 52, the computer 11 first analyzes the trailer dictionary included in the trailer to identify the location of the root object. In the example of FIG. 3, the trailer dictionary includes "/Root 2 0 R" specifying that object 20 (N=2) is referred to as the root object. The root object includes information for referencing the catalog dictionary. Hereinafter, information for referencing an object will simply be called a "reference." A reference is indicated by an object number, for example. Hence, the catalog dictionary is acquired by analyzing the root object, which is object 20 in this case.

The catalog dictionary includes a reference to a Pages dictionary. The Pages dictionary is also called a "page tree." The Pages dictionary includes references to objects, such as content streams described later, that configure the pages. Thus, each object having the root object as a root contains information for referencing other objects. Each object also includes information specifying attributes of a page. Information specifying the attributes of a page is used as needed to create intermediate data (described later), raster data for one page, intermediate raster data, and the like. The catalog-dictionary table 52 is stored in the memory 12 based on results of analyzing the catalog dictionary in the image file 150. Specifically, the stored catalog-dictionary table 52 includes a reference to a Pages-dictionary table 53 which corresponds to the Pages dictionary in the image file 150. The Pages-dictionary table 53 is data extracted from the Pages dictionary stored in the image file 150 and thus includes a corresponding reference to an object that configures a page and information specifying the attributes of a page. The Pages-dictionary table 53 in the memory 12 may include references to objects that configure a page.

When analyzing the cross-reference table for objects in the image file 150, the computer 11 stores the object IDs and offsets in the memory 12 as the cross-reference table information 50. At this time, no analysis results for objects having the root object as a root are stored in the memory 12. Thereafter, each time one object is analyzed, a table corresponding to the object is stored in the memory 12. Then, a table containing analysis results for the object is created and stored in a work area of the memory 12 so that in a case that the next time the same object is referenced, the computer 11 need not analyze the image file 150 directly.

Specifically, the computer 11 determines whether the cross-reference table information 50 includes an "reference to entity (substance)" for a target object. A "reference to entity" indicates the analysis results (table, for example) for the object. If no "reference to entity" is provided, the computer 11 creates an object reference table 51 for indirectly referencing the analysis results (location of the entity, for example) of the object. The object reference table 51 associates the type of data extracted during object analysis with an action to be taken on the extracted data. For example, when the action is making reference to the entity, the type of data is associated with a reference to the table. In the example of FIG. 4, the computer 11 acquires the catalog dictionary from the image file 150 through analysis of the object 20, stores the acquired catalog dictionary as the catalog-dictionary table 52, and creates "20 table 51*a*" as an object reference table for referencing the catalog-dictionary table 52. The 20 table 51*a* stores the type "Dictionary" for the catalog dictionary 52 in association with the entity "Reference to the catalog-dictionary table."

After creating the object reference table 51, the computer 11 stores a reference to the object reference table 51 in the cross-reference table information 50 under an "Reference to Entity" column for the referenced object (target object). An "entity" is data such as the created object reference table 51. The "reference to entity" in the table stores information to be used for referencing the entity, such as the address of the memory 12 at which the entity is stored.

In S12 the computer 11 initializes the variables "page number in RIP," "maximum intermediate data amount," and "amount of free memory at RIP start." The "page number in RIP" is a counter value indicating the number of the page being converted to raster data. The "maximum intermediate data amount" is the maximum amount of intermediate data for one page among intermediate data for all pages being already created in the print job. Specifically, each time the processing of one page is completed, in S41 of a resource monitoring process described later in FIG. 8, the computer 11 calculates the amount of intermediate data for the page of intermediate data just processed and in S42-S43 updates the "maximum intermediate data amount" based on the amount of the intermediate data calculated in S41. The "amount of free memory at RIP start" is information specifying the total amount of free memory in the work area of the memory 12. In S12 the computer 11 initializes the "page number in RIP" to "1", the "maximum intermediate data amount" to "0", and the "amount of free memory at RIP start" to a currently calculated value M of an available space of the memory.

In S13 the computer 11 acquires Pages dictionary for one page by analyzing the objects in the image file 150 and stores the results of analysis as one or more Page-dictionary tables 53 in the memory 12. First, the computer 11 analyzes the "Pages" label in the catalog-dictionary table 52 and then analyzes the object referenced by that label. The "Pages" label in the catalog dictionary holds the value "3 0 R", which references the object 30 (here, N=3). The computer 11 analyzes the object 30 to extract information for a Pages dictionary table 53*a* as the analysis results and stores the extracted information as the Pages dictionary table 53*a* in the work area of the memory 12. Next, the computer 11 creates a 30 table 51*b* for indirectly referencing the Pages dictionary table 53*a* and stores the 30 table 51*b* in the "Reference to Entity" field of the cross-reference table information 50, as described above.

In this case the Pages dictionary in the image file 150 includes the key "Kids" specifying the location of child nodes, and the computer 11 stores this key "Kids" in the Pages dictionary table 53*a*. The computer 11 further references the key "Kids" in the Pages dictionary table 53*a* specifying the location of child nodes and analyzes these reference objects (objects 40 (N=40) and 120 (N=12) in this example). The computer 11 stores the results of this analysis as tables 53 such as a table 53*b* and the object reference tables 51 such as a table 51*c* in the memory 12. By repeating these steps, the "20 table 51*a*," the "30 table 51*b*," and a "40 table 51*c*" are stored in the work area of the memory 12 as the object reference tables 51 in the example of FIG. 4 so that the analysis results in the catalog dictionary 52 and Pages-dictionary tables 53*a* and 53*b* can be referenced thereafter without directly analyzing the image file 150. The process to store the tables 51, 52, and 53 is an example of the first process.

In an image file, many objects often reference the same object. For example, in the image file 150 shown in FIG. 3, objects 60 (N=6) and 130 (N=13) include respective (5 0 R) references 151 and 152 for an object 50 (N=5). While not shown in FIG. 4, the computer 11 first analyzes the object 50, and creates and stores in the memory 12 a 50 table 51 (not shown) and a corresponding Pages dictionary table 53 (not shown). Here, the 50 table 51 includes a reference to the corresponding Pages dictionary table 53, similarly to the 30 table 51*b* and 40 table 51*c*. Thus, by accessing the "reference to entity" in the cross-reference table information 50 based on the (5 0 R) reference 151 which is included in the object 60 and is a reference to the object 50, the computer 11 can read the 50 table 51 and reference the Pages dictionary table 53 from this 50 table 51 without directly analyzing the image file 150. Similarly, based on the (5 0 R) reference 152 in the object 130, the computer 11 can read the 50 table 51 specified as the "reference to entity" in the cross-reference table information 50 and can read from the memory 12 the Pages dictionary table 53 created through an analysis of the object 50, just as when analyzing the object N60. In the embodiment, the process to store the tables 52 and 53 by directly or indirectly referencing another object when in an object a reference to another object is described is an example of the third process.

A reference to the same object may be included in a plurality of objects on a single page or may be included in objects on a plurality of pages. In other words, while processing a print job, a reference to an object analyzed when processing one page may also be referenced by objects on the next and subsequent pages of the same print job. Therefore, after completing the processing of one page, the tables 50-53 that were stored in the memory 12 while processing that page are left stored in the memory 12 and are only deleted from the memory 12 after the printing process for that print job is completed.

In S14 the computer 11 updates an "amount of free memory at page start" variable. The "amount of free memory at page start" specifies the amount of free memory in the work area of the memory 12 before intermediate data is stored therein. Specifically, the computer 11 sets the "amount of free memory at page start" to the current amount of free memory. The "amount of free memory at page start" corresponds to the "amount of free memory at RIP start" minus the total data amount of the tables 50-53 that were stored in the work area of the memory 12. The tables 50-53 basically remain in the memory 12 after the computer 11 has processed the page prior to the page currently being processed and additional tables 50-53 will be added to the memory 12 in S13 while processing the current page. Accordingly, the "amount of free memory at page start" variable set in S14 generally becomes smaller after each page in the print job is processed.

In S15 the computer 11 references the "page number in RIP" to determine whether the current page for which raster data is to be created is the first page of the print job. When the current page is the first page, the "page number in RIP" remains "1", as initialized in S12. When the computer 11 determines in S15 that the current page is the first page (S15: YES), in S17 the computer 11 acquires the content stream included in the image file 150. As shown in FIG. 3, the content stream is an object included in the image file and is referred to as "Contents" in the Pages dictionary table 53 (53b). In the example of FIG. 3, the content stream is object 110 (N=11). The entity (substance) of the content stream is the data from "stream" to "endstream" that is preceded by the description "Length" specifying the data amount of the content stream. The content stream includes image data and data for drawing (drawing operators described later).

Figure 5:
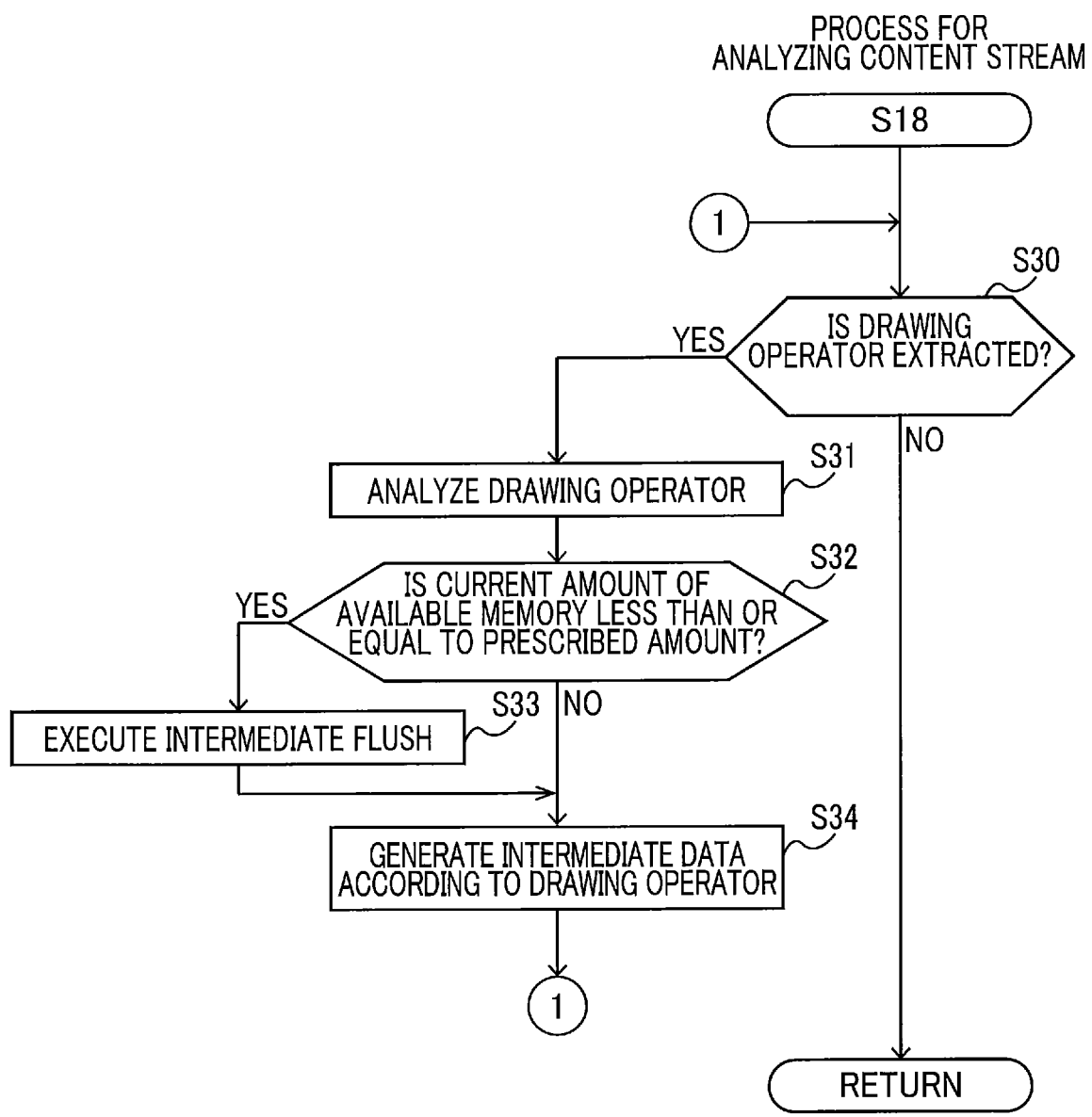
FIG. 5 is a flowchart illustrating a process of S18 for analyzing content stream shown in FIG. 2.
Figure 6A:
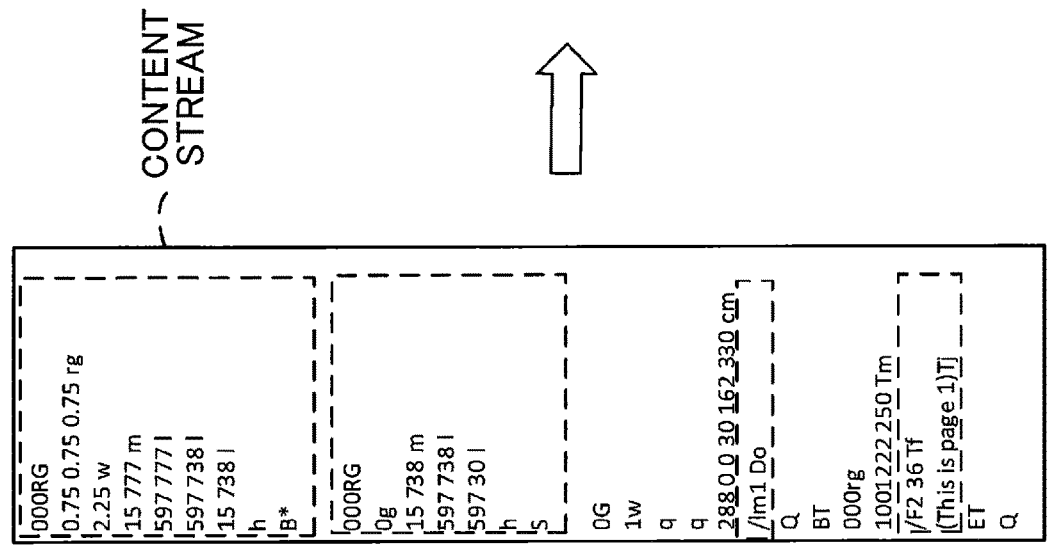
FIGS. 6A-6C are explanatory diagrams illustrating a drawing process.
Figure 6B:
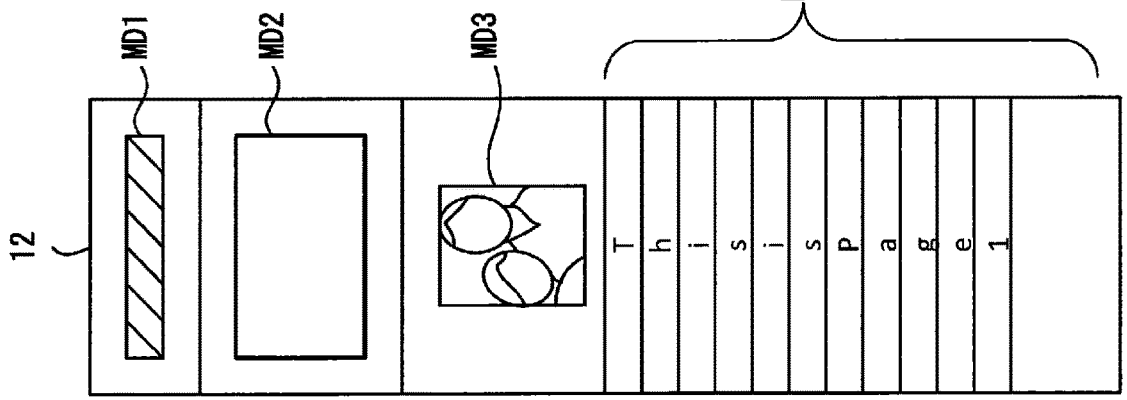

In S18 the computer 11 analyzes the content stream acquired in S17 and creates one page worth of intermediate data. FIG. 5 is a flowchart illustrating steps in the process of S18. FIGS. 6A-6B are explanatory diagrams showing an analysis of the content stream. The process of S18 executed by the firmware 20 is an example of the second process.

In S30 of FIG. 5 the computer 11 determines whether a drawing operator could be extracted from the content stream. The drawing operator is a descriptor that provides instructions for drawing image data included in the content stream. When the drawing operator was extracted (S30: YES), in S31 the computer 11 analyzes the extracted drawing operator.

In S32 the computer 11 determines whether the current amount of free memory in the memory 12 is less than or equal to a prescribed amount. When YES determination is made in S32, the computer 11 executes an intermediate flush described later in detail. When the current amount of free memory is greater than the prescribed amount (S32: NO), in S34 the computer 11 generates intermediate data based on the results of the drawing operator analysis in S31. The intermediate data is data specifying a portion of the raster data for one page using a language that is more primitive than the page description language used in the target image data. The primitive language may be defined by the manufacturer of the printing device 10, for example. The prescribed amount used in the determination of S32 specifies an amount of available memory in the memory 12 when it is determined that an intermediate flush described later must be executed. The prescribed amount may be 5 MB, for example.

After completing the process in S34, the computer 11 returns to S30 and once again determines whether another drawing operator could be extracted from the content stream. When another drawing operator was extracted (S30: YES), in S31 the computer 11 analyzes the extracted drawing operator and in S34 generates intermediate data according to the results of the drawing operator analysis, as described above.

The computer 11 continues to create one page worth of intermediate data by repeating the process in S30-S34. Based on the content stream of the image file 150 shown in FIG. 6A, the computer 11 generates intermediate data MD1-MD14 for one page and stores this intermediate data in the work area of the memory 12. In FIG. 6B, the intermediate data MD1 is a gray rectangular image, the intermediate data MD2 is a rectangular border image, and the intermediate data MD3 is an image, such as a photographic image. The intermediate data MD4-MD14 is text.

When there is no unprocessed drawing operator in the content stream (S30: NO), the computer 11 advances to S19 of FIG. 2. In S19 the computer 11 calculates the amount of memory used for the drawing data using the following Equation (1).

$$\text{Amount of memory used for drawing data} = \text{amount of free memory at page start} - \text{current amount of free memory} \quad (1)$$

The "drawing data" is intermediate data MD for one page (a current page) acquired through the analysis in S18, and the tables 50-53 stored in the memory 12. Hence, the "amount of memory used for drawing data" is the amount of memory space in the memory 12 that the intermediate data MD for one page and the tables 50-53 occupy. The "amount of free memory at page start" is the value acquired in S14. The "current amount of free memory" is the amount of free (available) memory in the work area of the memory 12 after the page worth of intermediate data MD was stored in the work area in S18.

Figure 6C:
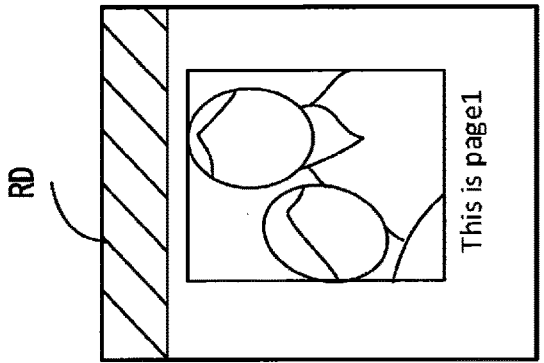

In S20 the computer 11 executes a drawing process using the page worth of intermediate data MD generated through the content stream analysis in S18. In the drawing process, the computer 11 creates one page worth of raster data RD from the page worth of intermediate data MD stored in the memory 12. Creating one page worth of raster data from one page worth of intermediate data is called flushing. In the example of FIG. 6A-6C, the computer 11 writes the raster data RD for one page to a page memory area of the memory 12 shown in FIG. 6C based on the page worth of intermediate data MD1-MD14 (see FIG. 6B) stored in the work area. In the present embodiment, the computer 11 further deletes the page worth of intermediate data MD from the work area of the memory 12. However, the computer 11 does not delete the cross-reference table information 50, the object reference tables 51, and the catalog-dictionary table 52 from the work area of the memory 12 in the drawing process.

In S21 the computer 11 determines whether the image file 150 includes a content stream for another page. When the image file 150 does not include any more content streams (S21: NO), the computer 11 ends the raster data creation process of FIG. 2. However, when a content stream for another page is included (S21: YES), in S22 the computer 11 increments the "page number in RIP" by 1 and subsequently returns to S13. In S13 the computer 11 acquires the Pages dictionary for the next page from the image file 150 and stores the acquired Pages dictionary as one or more Pages-dictionary tables 53 in the work area of the memory 12. Thereafter, the computer 11 executes the process described above in S14-S17 for the next page. As described above, in the process of S14 the current amount of free memory decreases as each page in a single print job is processed and, hence, the "amount of free memory at page start" calculated in S14 grows smaller.

When advancing to S15, the computer 11 determines that the page for which raster data is to be created is now the second page (S15: NO), and in S16 the computer 11 executes a resource monitoring process. In the resource monitoring process, the computer 11 determines whether various tables stored in the memory 12 should be deleted based on the amount of available memory in the work area of the memory 12. The resource monitoring process of S16 will be described later. Subsequently, the computer 11 advances to S17 to acquire the content stream for the next page. In S18 the computer 11 analyzes the content stream acquired in S17.

In a case that, after completing the process in S30-S31 of FIG. 5, the computer 11 determines in S32 that the current amount of free (available) memory space is less than or equal to the prescribed amount (S32: YES), in S33 the computer 11 executes the intermediate flush. The intermediate flush is a process performed to increase the amount of available memory in the memory 12 before a page worth of intermediate data MD is stored in the memory 12.

FIGS. 7A-7D are explanatory diagrams illustrating the intermediate flush. When the computer 11 determines that the available memory in the work area of the memory 12 has fallen to the prescribed amount or less after intermediate data MD1-MD3 has been stored in the work area, as illustrated in FIG. 7A (S32: YES), the computer 11 creates intermediate raster data MRD from the intermediate data MD1-MD3 already stored in the memory 12, as illustrated in FIG. 7B. The intermediate raster data MRD is created using only the intermediate data MD currently stored in the work area of the memory 12 rather than using all of the intermediate data for one page. The computer 11 compresses the intermediate raster data MRD and writes the intermediate raster data MRD to the work area of the memory 12. At this time, the intermediate data MD1-MD3 is deleted from the memory 12. In this way, the computer 11 can increase the available memory capacity of the memory 12. Note that the compressed intermediate raster data MRD may be stored in the memory 12 after first deleting the intermediate data MD from the memory 12 provided that the compressed intermediate data MRD is calculated using a temporal area of the memory 12 and remains stored in the temporal area.

After completing the intermediate flush in S33, the computer 11 generates one page worth of raster data RD in S34 described above, and in the process of S19 and S20 of FIG. 2 writes the raster data RD to the page memory area of the memory 12. However, when an intermediate flush was executed in S33, the page worth of raster data is generated using compressed intermediate raster data stored in the memory 12. Specifically, the computer 11 first decompresses the compressed intermediate raster data, and thereafter creates the page of raster data RD using the decompressed intermediate raster data MRD and the remaining intermediate data MD (MD4-MD14). Subsequently, the computer 11 writes this raster data RD to the page memory area of the memory 12 (see FIG. 7D). Since the intermediate raster data MRD is also used to create the page of raster data in the drawing process of S20, this intermediate raster data may also be treated as a type of intermediate data.

When an intermediate flush is executed as described above, the computer 11 first compresses the intermediate raster data MRD and subsequently decompresses the intermediate raster data MRD in the memory 12. Consequently, the raster data creation process (S20) for creating a page of raster data requires more time when an intermediate flush is executed than when the intermediate flush is not executed. Therefore, in the resource monitoring process of the present embodiment performed in S16, the computer 11 monitors the available memory in the memory 12. When the amount of available memory satisfies a specific condition, the computer 11 frees up memory space in the memory 12 to reduce the possibility of needing an intermediate flush.

FIG. 8 is a flowchart illustrating steps in the resource monitoring process of S16. FIG. 9A-9D are explanatory diagrams showing how memory capacity changes during the resource monitoring process. In this example, FIG. 9A-9D illustrate changes in memory capacity through the creation of three pages of raster data. FIG. 9A shows the amount of free memory at RIP start. FIG. 9B shows the memory capacity prior to executing the drawing process for the first page. FIG. 9C shows the memory capacity prior to executing the drawing process for the second page. FIG. 9D shows the memory capacity prior to executing the drawing process for the third page. In the drawing, "A" denotes memory space occupied by the cross-reference table information 50 and the catalog-dictionary table 52, "B" denotes memory space occupied by the object reference tables 51 and the Pages-dictionary tables 53, and "C" denotes memory space occupied by the intermediate data MD.

In S40 the computer 11 calculates the resource memory usage using the following Equation (2). Here, resource memory usage is the amount of memory in the memory 12 occupied by the tables 50-53.

$$\text{Resource memory usage} = \text{amount of free memory at RIP start} - \text{current amount of free memory} \quad (2)$$

In other words, using the above Equation 2, the computer 11 calculates the amount that the available memory capacity decreased after storing the tables 50-53 in the memory 12 while the decreased amount of the available memory capacity is regarded as the amount of memory space occupied by the tables 50-53 that were stored in the memory 12 in S13.

In S41 the computer 11 calculates the amount of intermediate data for the previous page based on the values calculated in S19 and S41 and using the following Equation (3).

$$\text{Amount of intermediate data for previous page} = \text{amount of memory used for drawing data} - \text{resource memory usage} \quad (3)$$

In S42 the computer 11 determines whether the amount of intermediate data for the previous page that was calculated in S41 is greater than the maximum intermediate data amount. When the amount of intermediate data for the previous page is no greater than the maximum intermediate data amount (42: NO), the computer 11 advances to S44. However, when the amount of intermediate data for the previous page is greater than or equal to the maximum intermediate data amount (S42: YES), in S43 the computer 11 replaces the maximum intermediate data amount with the amount of intermediate data for the previous page.

In S44 the computer 11 determines whether the memory 12 is in a prescribed state based on the following Inequality (4). Here, the prescribed state is a state that the memory 12 satisfies the Inequality (4) or Inequality (5) described later.

Current amount of free memory<maximum intermediate data amount+resource memory usage+α  (4)

Here, "α" is a value indicating a buffer for available memory capacity in the memory 12 and is determined based on the total memory capacity of the work area in the memory 12. In the example of the present embodiment, α is 5 MB.

When YES determination is made in S44, then it is likely that an intermediate flush will be required if the computer 11 continues to analyze objects with the current available memory capacity (the current amount of free memory). Thus, in S46 the computer 11 deletes one or more tables for analyzed objects currently stored in the memory 12. Specifically, the computer 11 deletes part of object reference tables 51 and all of Pages dictionary tables 53 from among the tables currently stored in the work area of the memory 12 but does not delete the cross-reference table information 50, the 20 table 51a which is based on the catalog dictionary (root object), and the catalog dictionary table 52. The computer 11 may leave one or more Pages dictionary tables undeleted.

As shown in FIGS. 9B and 9C, the amount of the intermediate data MD stored in the memory 12 when creating raster data for one page varies from page to page. Since the maximum amount of the intermediate data MD stored in the memory 12 when creating raster data for one page is used in the determination of S44, the computer 11 is more likely to make YES determination in S44 in a case that intermediate data MD of a large amount has been stored in the memory 12 while processing any page of a single print job. By deleting tables from the memory 12 in S46, the computer 11 can free up memory in the memory 12 so that the computer 11 is less likely to determine in S32 of FIG. 5 that the amount of available memory is less than or equal to the prescribed amount, and thus the computer 11 is likely to make NO determination in S32. That is, this process can suppress the occurrence of intermediate flushes executed in S33.

When the same object is referenced many times, the number of new object reference tables 51 and Pages dictionary tables 53 added to the memory 12 gradually decreases as the process of the print job proceeds. On the other hand, when the same object is referenced fewer times as processing of the print job proceeds, the number of new object reference tables 51 and Pages dictionary tables 53 added to the memory 12 will not decrease. In creating raster data for the page currently being processed, the quantity of data in tables that were newly added to the memory 12 is considered in the determination of S44. That is, since the resource memory usage is calculated by Equation (2), the calculated resource memory usage reflects the quantity of data of the newly added tables. More specifically, in a case that new data other than the newly added table is not stored in the memory 12, the resource memory usage indicates the total data amount of the tables including the newly added tables. In a case that new data other than the newly added tables is stored in the memory, the resource usage amount is larger than the total data amount of the tables by the amount of the newly added tables. Consequently, when the number of tables added to the memory 12 is large, the computer 11 is more likely to reach a positive determination in S44 and advance to S46.

Instead of using the above Inequality (4) for determining available memory capacity in S44, the computer 11 may determine whether the current amount of free memory is less than the maximum intermediate data amount plus α. In this case, the maximum intermediate data amount may be a fixed amount obtained through experimentation or the like. Alternatively, the computer 11 may determine whether the current amount of free memory is less than the resource memory usage plus α.

However, when NO determination is made in S44, in S45 the computer 11 determines whether or not the amount of available memory in the memory 12 is in the prescribed state based on the following Inequality (5).

Amount of free memory at RIP start−current amount of free memory>amount of free memory at RIP start/2  (5)

Here, as illustrated in FIG. 9A, the "amount of free memory at RIP start" is the maximum memory capacity of the working area in the memory 12, i.e., the memory capacity when no tables have been stored in the memory 12. In S45 the computer 11 determines whether the memory usage of all tables 50-53 that have been stored in the work area of the memory 12 to date during the processing of one print job exceeds half the available memory. In the present embodiment, the value indicated by "amount of free memory at RIP start/2" should be larger than the "prescribed amount" used in the determination of S32 in the resource monitoring process. When the work area of the memory 12 has a capacity of 60 MB, for example, the "amount of free memory at RIP start/2" is a value of approximately 30 MB.

Rather than using the above Inequality (5) for the determination in S45, the computer 11 may determine whether the amount of free memory at RIP start minus the current amount of free memory is greater than a prescribed determination amount for available memory. In this case, the determination amount for available memory may be larger than the prescribed amount used in the determination of S32 in the resource monitoring process.

When the computer 11 reaches NO determinations in both S44 and S45, the computer 11 advances to S17 in FIG. 2 since the amount of free memory in the memory 12 is deemed sufficient and, hence, there is little possibility that an intermediate flush will be required if object analysis is continued. Since the process from S17 was described previously, a description of this process will not be repeated here.

Note that with respect to the determination of the available space of the memory 12, the computer 11 may not execute the determination in S45 after NO determination is made in S44. In this case, the computer 11 advances to S17 of FIG. 2 when reaching NO determination in S44. Alternatively, the computer 11 may execute only the determination in S45 and omit the process of S44. In this case, the computer 11 advances to S45 after reaching NO determination in S42 or after completing the process in S43.

The tables to be deleted in the process of S46 in FIG. 8 may include the catalog-dictionary table 52 and the 20 table 51a. Alternatively or in addition, the computer 11 may delete the cross-reference table information 50 from the memory 12 in the process of S46. Alternatively or in addition, Pages dictionary tables 53 and object reference tables 51, excluding the 20 table 51a, need not be deleted in the process of S46.

The embodiment described above can obtain the following effects. In the resource monitoring process, the computer 11 increases the amount of free memory in the memory 12 by deleting tables that were extracted from objects and stored in the memory 12 when the amount of free memory in the memory 12 reaches the prescribed state while the computer 11 of the printing device 10 is executing the raster data creation process. This process can avoid hindrances to the printing process due to insufficient free memory in the memory 12. As a result, the computer 11 can reduce the occurrence of intermediate flushes while also reducing the possibility of memory-full errors, for example.

When an object analyzed in the raster data creation process includes a reference to another object and when a table included in the other referenced object is already stored in the memory 12, the computer 11 processes data, which is extracted from the object stored in the memory 12, without reanalyzing the referenced object. This improves processing efficiency for creating raster data while avoiding any hindrances to the printing process caused by insufficient available memory space in the memory 12.

The prescribed state in the resource monitoring process is a state in which the amount of free memory space in the memory 12 is smaller than the amount of free memory space in the memory 12 before the raster data creation process was executed and larger than the prescribed amount used to determine the need for an intermediate flush. Through this process, the computer 11 can increase the amount of available memory prior to creating the intermediate raster data. Accordingly, the computer 11 can avoid any hindrances to the printing process caused by insufficient available memory in the memory 12.

In the resource monitoring process, the computer 11 determines whether the memory 12 is in the prescribed state each time raster data for printing a page is being created in the raster data creation process. When the computer 11 determines that the memory 12 is in the prescribed state, the computer 11 increases the amount of free memory in the memory 12 by deleting data stored in the memory 12 that was extracted from objects. In this way, the computer 11 monitors the state of the memory 12 each time raster data for one page is being created and can avoid any hindrances to the printing process caused by insufficient available memory in the memory 12.

In the resource monitoring process, the computer 11 identifies a maximum intermediate data amount, which indicates the maximum amount of memory occupied by intermediate data for one page each time a page of raster data is created and determines whether the amount of free memory in the memory 12 is in the prescribed state based on the maximum intermediate data amount. Since the amount of intermediate data differs for each page that is printed, the computer 11 determines whether the amount of free memory is in the prescribed state based on the maximum amount of intermediate data that was required to print any one page, thereby avoiding any hindrances to the printing process caused by insufficient available memory in the memory 12.

In the resource monitoring process, the computer 11 determines whether the amount of free space of the memory 12 is in the prescribed state based on the amount of data of tables stored in the memory 12 for creating one page worth of raster data. It is determined that the amount of free memory is in the prescribed state each time a page of raster data is created even if the amount of data for tables stored in the memory 12 varies. Thus, the computer 11 can avoid any hindrances to the printing process caused by insufficient available memory in the memory 12.

In the resource monitoring process, the prescribed type of data is extracted from data described in the root of the image file 150, such as a root object. This process can prevent the computer 11 from being unable to continue analysis of objects in an image file after memory in the memory 12 has been freed up.

In the raster data creation process, the computer 11 repeats object analysis after increasing the amount of available memory in the resource monitoring process by deleting data extracted from objects, and subsequently executes the drawing process to create raster data for printing. In this way, the computer 11 can continue to create raster data after increasing the amount of available memory space in the memory 12.

Variation of the Embodiment

While analyzing a content stream in the embodiment described above, the computer 11 does not delete the object reference tables 51 and Pages dictionary tables 53 stored in the memory 12 when executing an intermediate flush in S33. However, the computer 11 may delete tables 51 and 53 from the memory 12 when executing an intermediate flush in S33. In this case, the computer 11 may delete tables 51 and 53 from the memory 12 when determining that the current amount of free memory is less than half the amount of free memory at RIP start.

In the resource monitoring process of the embodiment described above, the computer 11 determines whether the memory 12 is in the prescribed state each time a page of raster data is created. However, the computer 11 may instead determine whether the memory 12 is in the prescribed state each time two or more pages of raster data have been created. In this case, the computer 11 may execute the resource monitoring process in S16 of FIG. 2 after reaching a negative determination in S15, on the condition that at least two pages of raster data have been created.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art.

In the embodiment, the image file is the PDF file. However, the file format of the image file may not be the PDF and may be any format that can contain a plurality of objects.

In the embodiment, the printing device has the printing function only. However, the printing device may have a plurality of functions such as a scanner function to read an image and a facsimile function.

What is claimed is:

1. A printing device comprising:
    a memory;
    a printing mechanism; and
    a computer,
    wherein the computer is configured to perform:
        an acquiring process to acquire an image file having a plurality of objects, the image file defining a plurality of pages;
        a raster data creating process to analyze the acquired image file and create raster data based on the image file by using a result of analyzing, the raster data including a plurality of sets of raster data for respective ones of the plurality of pages; and
        a printing process to print a plurality of images for respective ones of the plurality of pages based on the created raster data,
    wherein in the raster data creating process, the computer is configured to perform:

selecting a target object from the plurality of objects in the image file;

an object process based on the selected target object in which a selected one of a first process and a second process is performed; and a drawing process to create the raster data, wherein the first process is performed when the target object includes data on a reference to another object, the first process being to store, in the memory, data as a set of extraction data having a reference to the other data to be used to create the raster data by analyzing and at least partially extracting data from the target object, wherein the second process is performed when the target object includes content data, the second process being to create a set of intermediate data based on the target object, and to store the created set of intermediate data in the memory, wherein each time a new target object is selected, the object process is performed on the new target object, and a corresponding one of a set of extraction data and a set of intermediate data is stored in the memory, wherein executing the drawing process on one or more created sets of intermediate data creates the raster data, wherein the computer is configured to further perform:

a resource monitoring process, when the memory is in a prescribed state during the raster data creating process, the resource monitoring process being to increase an amount of available space of the memory by deleting one or more sets of extraction data, each having a reference to other data, from the memory, the prescribed state being a state satisfying that the amount of available space of the memory is smaller than a previous amount of available space of the memory before the raster data creating process is performed and satisfying a prescribed condition, wherein the raster data creating process is performed on a page-to-page basis to create the plurality of sets of raster data for respective ones of the plurality of pages, wherein the raster data creating process performs:

analyzing one or more objects for one page, and creating a set of raster data used for printing the one page after all of one or more sets of intermediate data for the one page are stored in the memory, and subsequent to the creating the set of raster data used for printing the one page, deleting all of the one or more sets of intermediate data for the one page from the memory while maintaining one or more sets of extraction data in the memory, wherein the computer is configured to further perform:

an intermediate flush process when the amount of available space of the memory is smaller than a prescribed determination amount and before storing all of the one or more sets of intermediate data required for creating the set of raster data for the one page in the memory is complete, the intermediate flush process performing creating a set of intermediate raster data based on two or more sets of intermediate data for the one page; and deleting from the memory all the two or more sets of intermediate data used for creating the set of intermediate raster data to increase the amount of available space of the memory, the set of intermediate raster data being intermediate data in a raster format, wherein the deleting the one or more sets of extraction data, each having the reference to the other data, from the memory in the resource monitoring process is performed to reduce a number of times the intermediate flush process is to be performed, and wherein once the deleting the one or more sets of extraction data, each having the reference to the other data, from the memory in the resource monitoring process is performed, the intermediate flush process is not performed until the amount of available space of the memory is smaller than the prescribed determination amount.

2. The printing device according to claim 1, wherein the computer is configured to further perform:

after each time the raster data creating process creates a set of raster data for one page and before the raster data creating process is executed for a next page, specifying the amount of available space of the memory and determining whether the memory is in the prescribed state; and when the determining determines that the memory is in the prescribed state, deleting at least one set of extraction data from the memory.

3. The printing device according to claim 1, wherein when a newly selected target object includes data on a reference to another object for which a set of extraction data is already stored in the memory in the first process, the raster data creating process uses the set of extraction data extracted from the another object to create the raster data without analyzing again the another object which is referenced in the newly selected target object in the image file.

4. The printing device according to claim 1, wherein the acquiring process acquires the image file in a Portable Document Format (PDF).

5. The printing device according to claim 1, wherein the prescribed state is a state satisfying that the amount of available space of the memory is smaller than the previous amount of available space of the memory before the raster data creating process is performed and satisfying that the amount of available space of the memory is larger than the prescribed determination amount.

6. The printing device according to claim 1, wherein the resource monitoring process performs:

determining whether the memory is in the prescribed state each time a set of raster data for a page is created in the raster data creating process; and deleting, when the memory is in the prescribed state, a plurality of sets of extraction data from the memory to increase the amount of available space of the memory.

7. The printing device according to claim 6, wherein the resource monitoring process performs:

specifying a maximum amount of data among total amounts of intermediate data for pages each time a set of raster data for a page is created, each total amount of intermediate data being a total amount of all of one or more sets of intermediate data for a corresponding one of the pages, wherein the resource monitoring process determines whether the memory is in the prescribed state based on the maximum amount of data.

8. The printing device according to claim 6, wherein the resource monitoring process determines whether the memory is in the prescribed state based on a data size of one or more sets of extraction data extracted from one or more objects to be used for creating a set of raster data for a page.

9. The printing device according to claim 6, wherein the resource monitoring process performs:

specifying a maximum amount of data among total amounts of intermediate data for pages each time a set of raster data for a page is created, each total amount of intermediate data for a page being a total amount of all of one or more sets of intermediate data for a corresponding one of the pages, wherein the resource monitoring process determines that the memory is in the prescribed state in a case that the amount of available space of the memory at a time after a set of raster data for a previous page is created and before a set of raster data for a page next to the previous page is created is smaller than a prescribed amount, the prescribed amount being a sum of the maximum amount of data and an amount of space occupied by sets of extraction data extracted from all of one or more objects for the page next to the previous page.

10. The printing device according to claim 6, wherein the resource monitoring process determines that the memory is in the prescribed state based on a result of comparing a maximum amount of possible available space of the memory since the raster data creating process is started with a data size of all of one or more sets of extraction data which are extracted from one or more objects and currently stored in the memory.

11. The printing device according to claim 1, wherein the computer is configured to further perform:

determining, for each set of extraction data, whether the set of extraction data is of a specific type, and wherein the resource monitoring process deletes a set of extraction data from the memory when the set of extraction data is not of the specific type, and maintains a set of extraction data in the memory when the set of extraction data is of the specific type.

12. The printing device according to claim 11, wherein the acquiring process acquires the image file in a Portable Document Format (PDF) in which a plurality of objects composes a tree structure originated from a root object, and wherein the specific type indicates a set of extraction data extracted from the root object.

13. The printing device according to claim 12, wherein the set of extraction data extracted from the root object includes a table having data on the reference to the another object in the image file.

14. The printing device according to claim 11, wherein after the resource monitoring process deletes the one or more sets of extraction data to increase the amount of available space of the memory, the raster data creating process creates a set of raster data after the object process is repeatedly executed and the drawing process is executed based on results of the repeatedly executed object process, wherein the raster data creating process performs:

specifying a maximum amount of data among total amounts of intermediate data for pages each time a set of raster data for a page is created, each total amount of intermediate data for a page being a total amount of one or more sets of intermediate data for the page, and wherein the resource monitoring process determines whether the memory is in the prescribed state based on the maximum amount of data.

15. The printing device according to claim 1, wherein after the resource monitoring process deletes the one or more sets of extraction data to increase the amount of available space of the memory, the raster data creating process creates a set of raster data by repeatedly executing the object process and executing the drawing process based on results of the repeatedly executed object process.

* * * * *